US012642251B1

(12) United States Patent
Velardi

(10) Patent No.: US 12,642,251 B1
(45) Date of Patent: Jun. 2, 2026

(54) AUTOMATED CHICKEN FEEDER INCLUDING A VERTICALLY SLIDABLE DOOR FOR A PLURALITY OF FEED ACCESS PORTS

(71) Applicant: Andrew Velardi, Deerfield Beach, FL (US)

(72) Inventor: Andrew Velardi, Deerfield Beach, FL (US)

( * ) Notice: Subject to any disclaimer, the term of this patent is extended or adjusted under 35 U.S.C. 154(b) by 0 days.

(21) Appl. No.: 18/775,372

(22) Filed: Jul. 17, 2024

Related U.S. Application Data

(60) Provisional application No. 63/527,915, filed on Jul. 20, 2023.

(51) Int. Cl.
*A01K 39/01* (2006.01)

(52) U.S. Cl.
CPC .............................. *A01K 39/0113* (2013.01)

(58) Field of Classification Search
CPC ........ A01K 5/02; A01K 5/0291; A01K 31/02; A01K 31/18; A01K 39/0113
USPC ...................................... 119/51.12
See application file for complete search history.

(56) References Cited

U.S. PATENT DOCUMENTS

| | | | | |
|---|---|---|---|---|
| 4,756,277 A * | 7/1988 | Peng | .................... | A01K 5/0291 119/51.11 |
| 8,544,418 B2 * | 10/2013 | Jiang | .................... | A01K 1/0356 119/493 |
| 9,775,329 B1 * | 10/2017 | Miller | .................... | A01K 31/02 |
| 11,484,012 B2 * | 11/2022 | Luce | .................... | G05B 15/02 |
| 2003/0221631 A1 * | 12/2003 | Yarbrough | ................ | E06B 7/32 119/484 |
| 2007/0068459 A1 * | 3/2007 | Lucken | ................ | A01K 5/0291 119/712 |
| 2011/0113692 A1 * | 5/2011 | Stamper | ................ | E05F 15/614 340/5.1 |
| 2019/0098874 A1 * | 4/2019 | Burton | ................. | A01K 29/005 |
| 2019/0254260 A1 * | 8/2019 | Nguyen | ................. | G07C 9/30 |
| 2020/0296938 A1 * | 9/2020 | Luce | ..................... | A01K 31/02 |
| 2021/0000080 A1 * | 1/2021 | Tuthill | ................. | E05F 15/635 |
| 2021/0123283 A1 * | 4/2021 | Sutterer | ................. | E05F 15/40 |
| 2023/0255178 A1 * | 8/2023 | Niese | .................... | A01K 5/0291 119/51.12 |

* cited by examiner

*Primary Examiner* — Brady W Frazier
(74) *Attorney, Agent, or Firm* — Mark D. Bowen, Esq.; Malin Haley DiMaggio & Bowen, P.A.

(57) ABSTRACT

An automated chicken feeder is equipped with a motor actuated door and a photocell control system. The feeder door is designed to open during the day, allowing chickens to access the feed, and close at night to prevent rodents from stealing the feed. The photocell serves as a sensor to detect the ambient light levels and triggers the motorized door accordingly. The automatic chicken feeder provides a convenient and efficient solution for poultry farmers, minimizing manual labor and maintaining the integrity of the chicken feed.

8 Claims, 8 Drawing Sheets

AUTOMATED CHICKEN FEEDER INCLUDING A VERTICALLY SLIDABLE DOOR FOR A PLURALITY OF FEED ACCESS PORTS

CROSS REFERENCE TO RELATED APPLICATIONS

This application claims the benefit of provisional U.S. Patent Application Ser. No. 63/527,915, filed Jul. 20, 2023, the entirety of which is incorporated herein by reference.

STATEMENT REGARDING FEDERALLY SPONSORED RESEARCH OR DEVELOPMENT

N/A

COPYRIGHT NOTICE

BACKGROUND OF THE INVENTION

1. Field of the Invention

The present invention relates to an automated chicken feeder designed to facilitate the feeding of chickens via feeding ports while minimizing the risk of feed depletion rodents and other animals. More specifically, the present invention provides a chicken feeder equipped with a motorized feed access door, controlled by a photocell, that opens during the day and closes at night to prevent rodents from accessing and consuming the chicken feed.

2. Description of Related Art

Chicken feeders are commonly used to provide poultry access to feed, ensuring their health and growth. Open and uncontrolled feeders, however, can attract unwanted pests such as rodents, which may consume or contaminate the feed. This can lead to waste, financial losses, and potential health issues for the livestock.

Existing solutions include manually operated feeders or basic gravity-feed systems, but these can be time-consuming for poultry farmers as they require frequent manual intervention to ensure proper operation. Automated feeders are also available, but few incorporate a mechanism specifically designed to prevent rodents from accessing the feed. Therefore, there is a need for an improved automatic chicken feeder that addresses the issues associated with rodent infestation, while providing convenient feeding for chickens.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The present invention overcomes the limitations and disadvantages in the art by providing an automated chicken feeder equipped with a motor actuated feed access door and a photocell control system. The control system is designed to open the door during the day, allowing chickens to access the feed, and to close the door at night to prevent rodents from stealing or contaminating the feed. The photocell serves as a sensor to detect the ambient light levels and triggers the motorized feed access door accordingly. The automated chicken feeder of the present invention provides a convenient and efficient solution for poultry farmers, minimizing manual labor and maintaining the integrity of the chicken feed.

Accordingly, it is an object of the present invention to provide advancements in the field of livestock feeding apparatus.

It is another object of the present invention to provide and a chicken feeder adapted with automated feed access control to provide dawn-to-dusk access to chicken feed.

Still another object of the present invention it to provide an automated chicken feeder that protects enclosed feed from contamination or consumption by nocturnal creatures.

These and other objects are met by the present invention which will become more apparent from the accompanying drawing and the following detailed description of the drawings and various embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "connected" is used. By "connected" is meant that the article or structure referred to is joined, either directly, or indirectly, to another article or structure. By "indirectly joined" is meant that there may be an intervening article or structure imposed between the two articles which are "connected". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value.

Turning now to the drawings, FIGS. 1-8 depict an automated chicken feeder, generally referenced as 10, in accordance with the present invention. Automated chicken feeder 10 includes a feed hopper 12 having an openable top 14 and defining feed access ports or feeding ports 16 formed in a lower portion of feed hopper 12. Access to the feed access ports is controlled by an access door that is positionable between a lowered/closed position and a raised/open configuration. A door actuation and control system generally referenced as includes a photocell and functions to open the door during the day, allowing chickens to access the feed, and close the door at night to prevent rodents from stealing the feed. The photocell serves as a sensor to detect the ambient light levels and triggers the access door accordingly. In a contemplated alternate embodiment a timing circuit, wireless BLUETOOTH® or WiFi control, may be substituted for, or used in conjunction with, photocell control.

Figure 1:
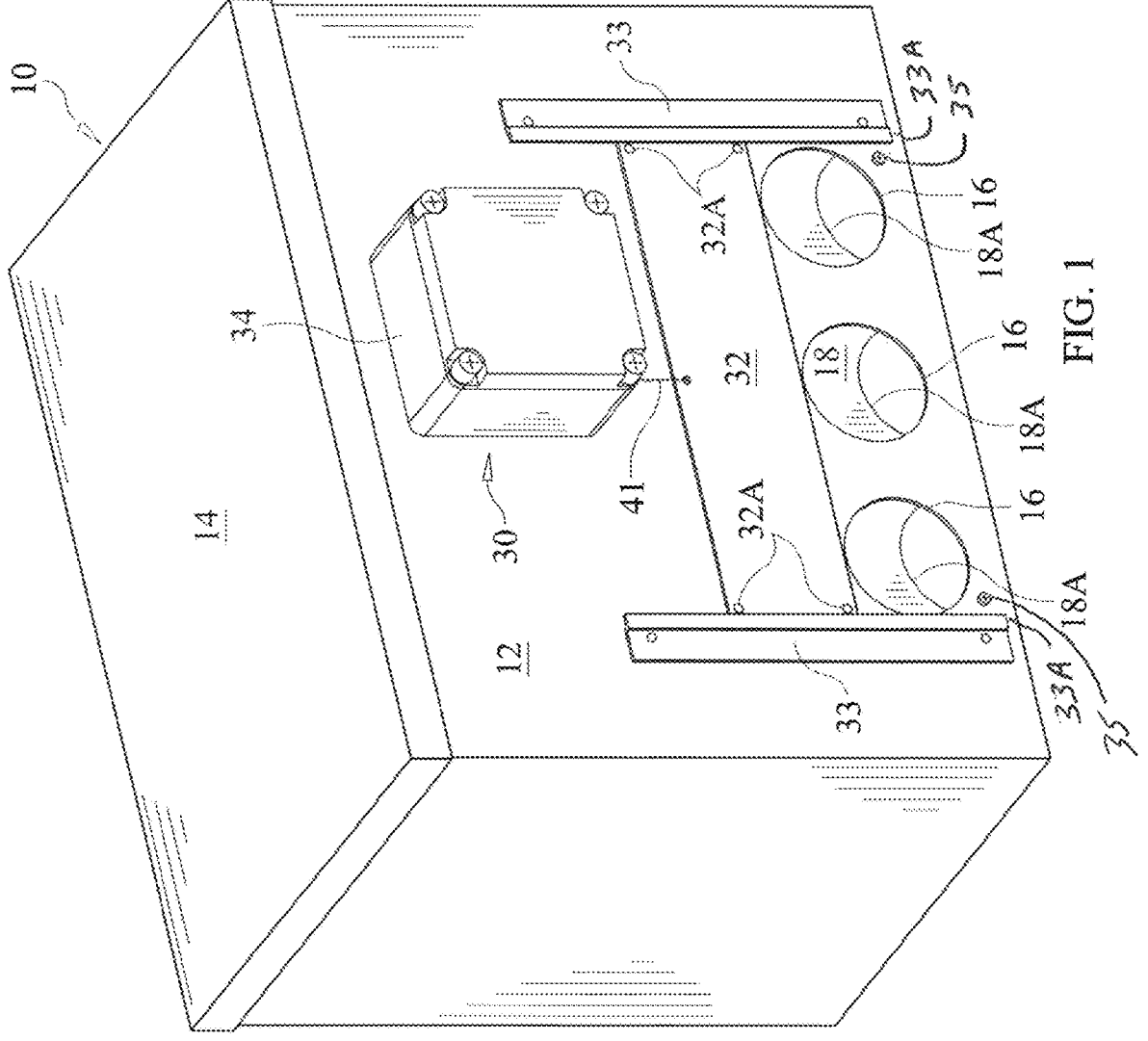
FIG. 1 is a front left perspective view of an automated chicken feeder in accordance with the present invention with the access door in the open configuration.
Figure 2:
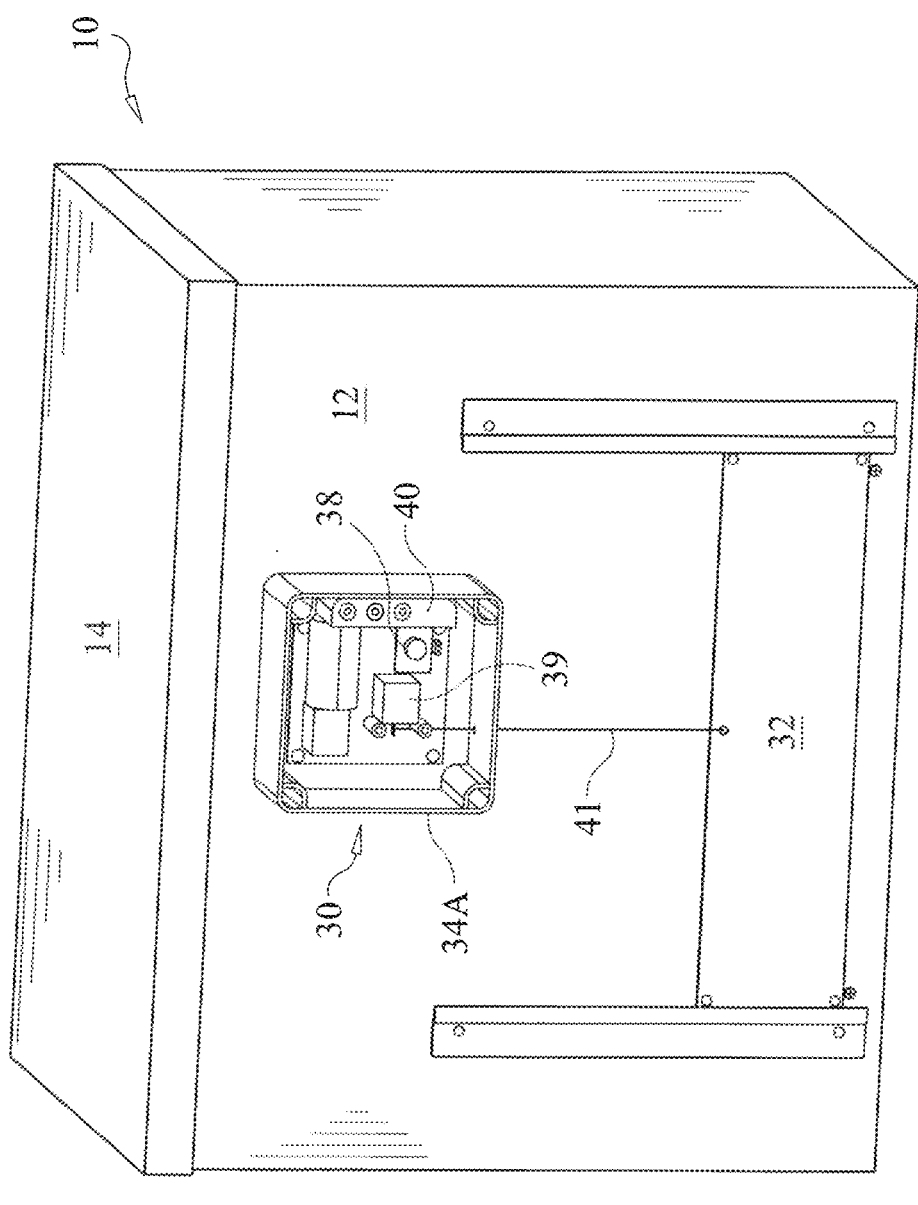
FIG. 2 is a front right perspective view thereof with the access door in the closed configuration.

As illustrated in FIGS. 1 and 2, automated chicken feeder 10 includes a feed hopper 12 having an openable or fully removable top 14. Feed hopper 12 comprises a container or compartment defining an internal volume that stores a sufficient quantity of chicken feed, and is designed to keep the feed dry and protected from external elements. In the embodiment illustrated, hopper 12 is box-shaped, however, any suitable hopper shape or configuration is considered within the scope of the present invention. Feed hopper 12 may be fabricated from steel, aluminum, plastic, or any other suitable material. Feed hopper 12 includes a removable hopper top 14. Hopper top 14 is configurable between an installed/closed configuration and a removed/open configuration, and may comprise a separable component or may be hingedly affixed to hopper 12. When in the closed configuration as seen in FIGS. 1 and 2, hopper top 14 forms a weather tight seal with feed hopper 12 to protect the enclosed feed from rain and other ambient contaminants.

Figure 5:
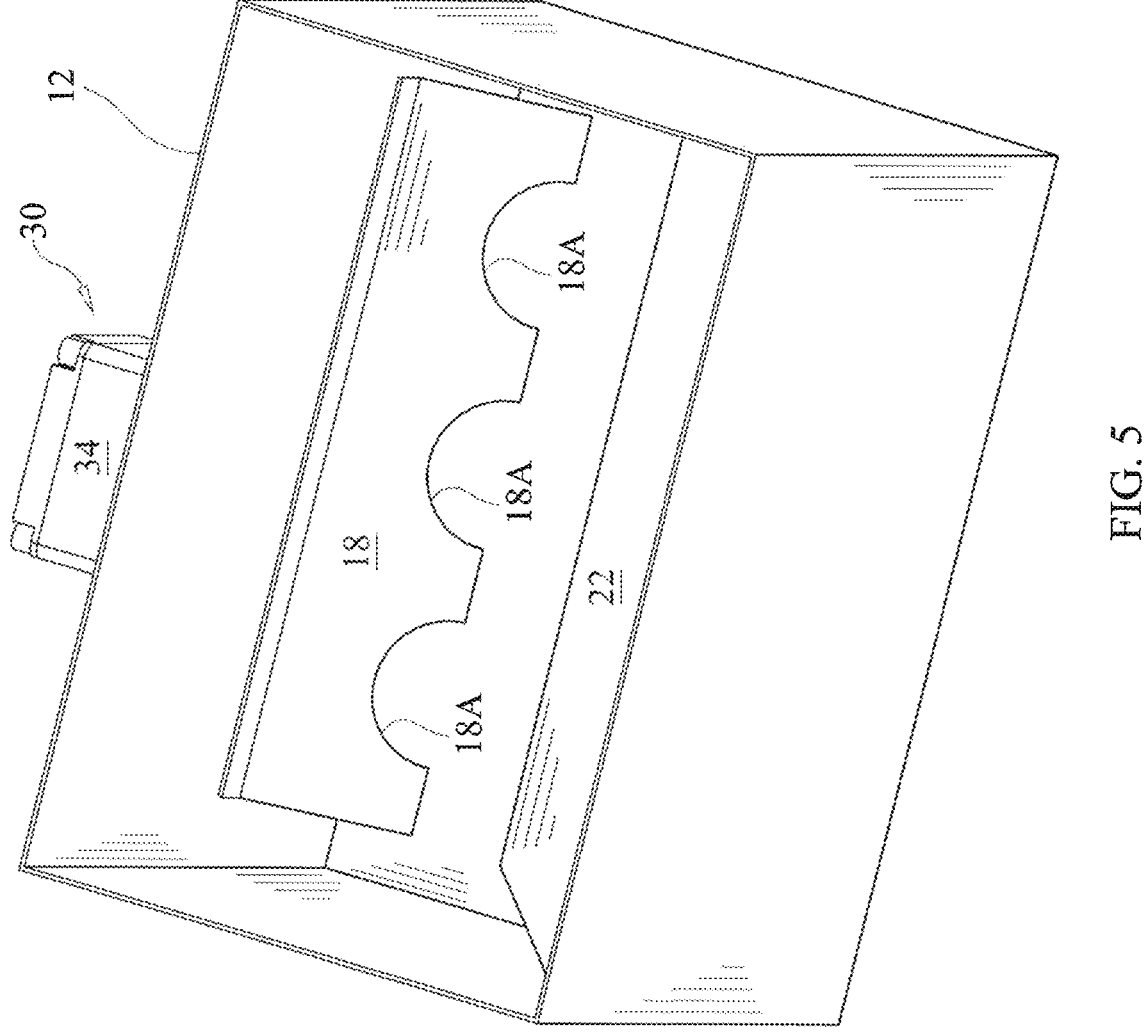
FIG. 5 is an open top view showing the empty interior of the hopper compartment and feed baffle.
Figure 6:
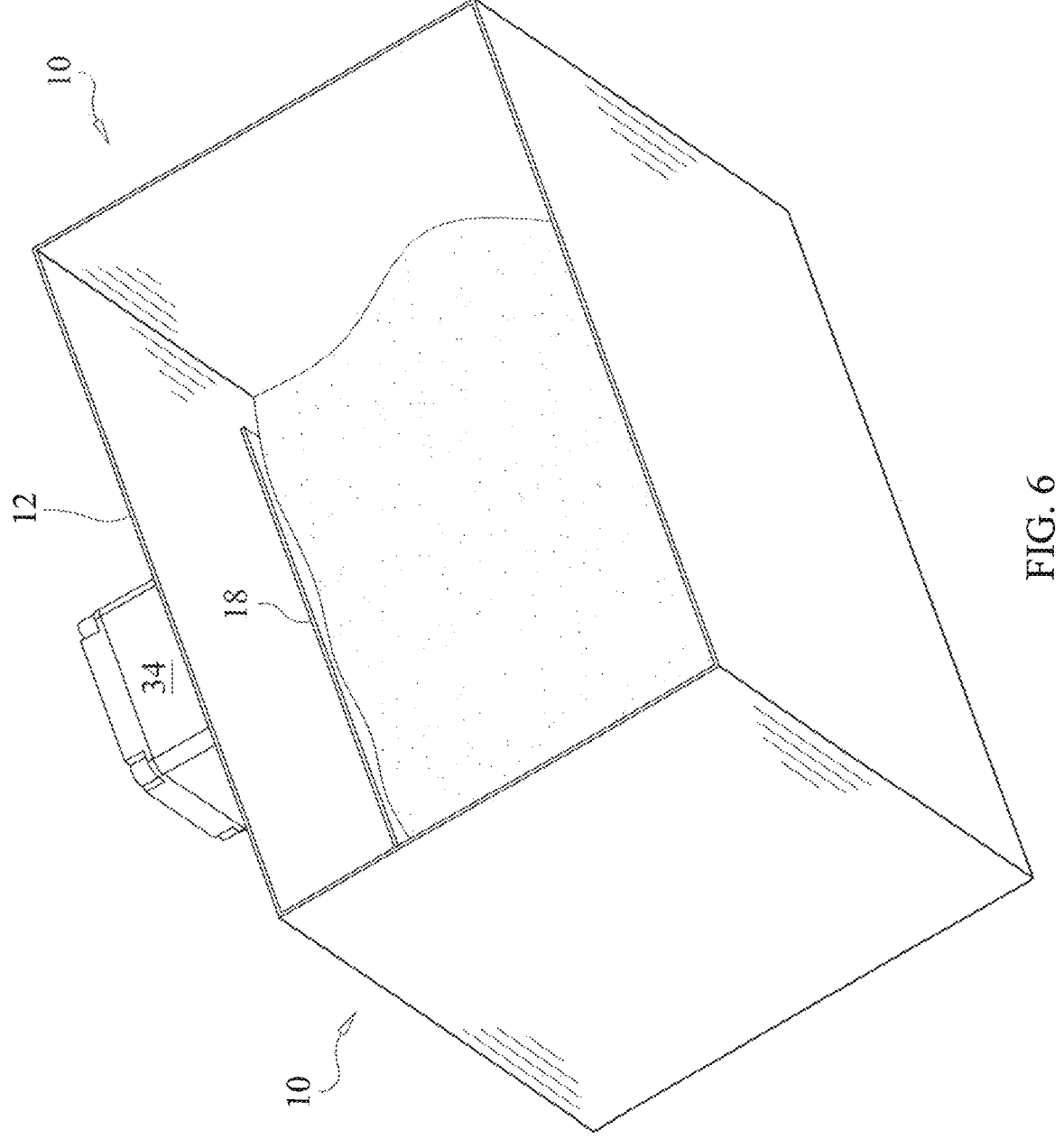
FIG. 6 is an open top view showing feed within the hopper compartment.

As seen in FIGS. 1-4, feed hopper 12 further defines a plurality of feed access ports, referenced as 16. Feed access ports 16 provide openings in the lower feed hopper body to allow chickens access to feed contained within the feed hopper. In a preferred embodiment, feed access ports 16 are circular in shape, however, any suitable geometric configuration is considered within the scope of the present invention. As seen in FIG. 5, a first interior baffle 18 projects angularly downward into the hopper interior from a position above feed access ports 16 and terminates is spaced relation with the bottom of the hopper. First interior baffle 18 provides a deflection surface that prevents feed fed into feed hopper 12 from simply spilling out of feed access ports 16. First interior baffle 18 further includes a bottom edge defining a plurality of notches, referenced as 18A, which function to allow feed to move forward toward feed access ports 16 urged by the weight of the feed above, while also allowing feeding chickens additional feeding space within the hopper.

Figure 3:
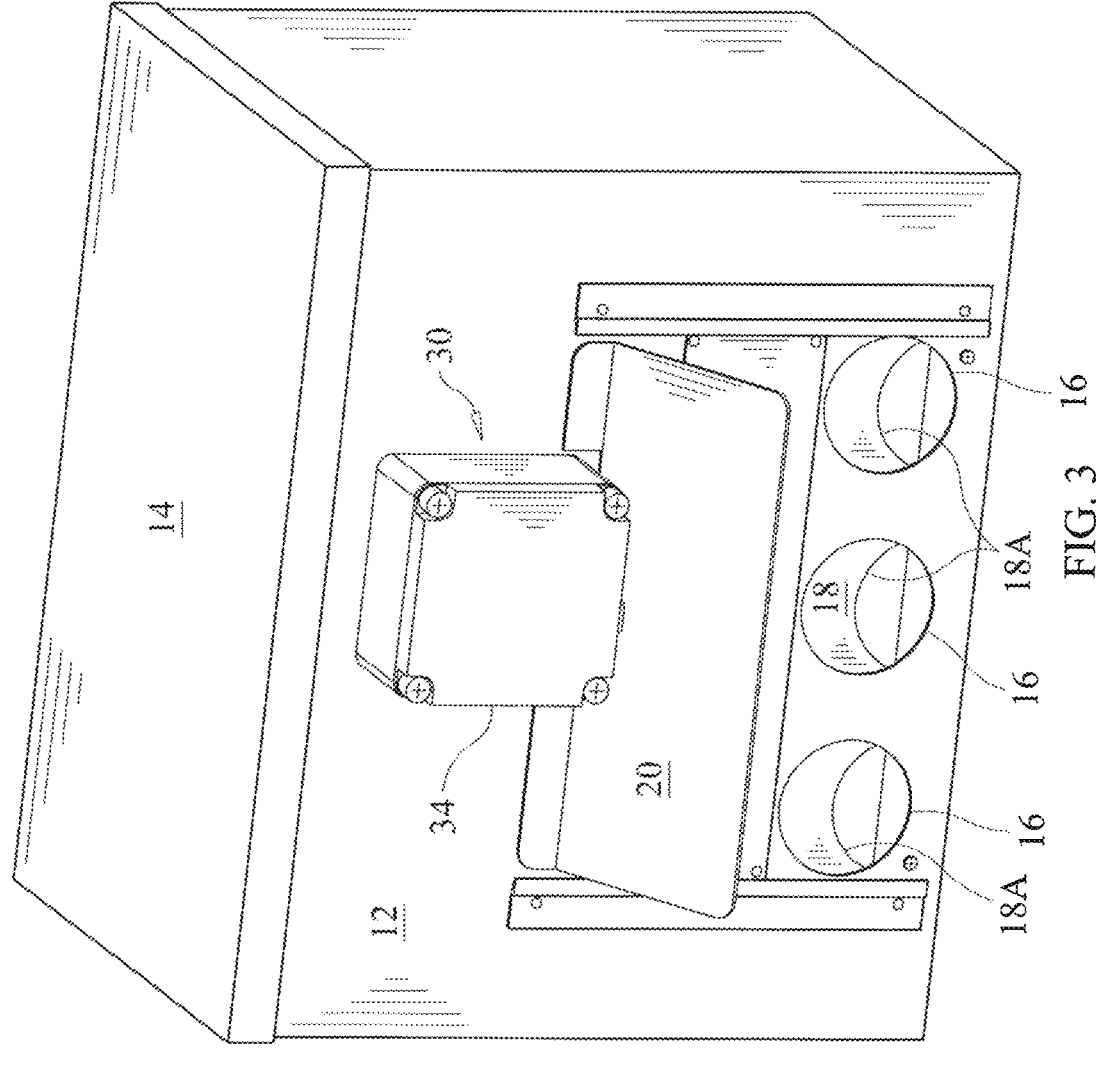
FIG. 3 is a front view of an alternate embodiment configuration automated chicken feeder adapted with a rain shield.
Figure 4:
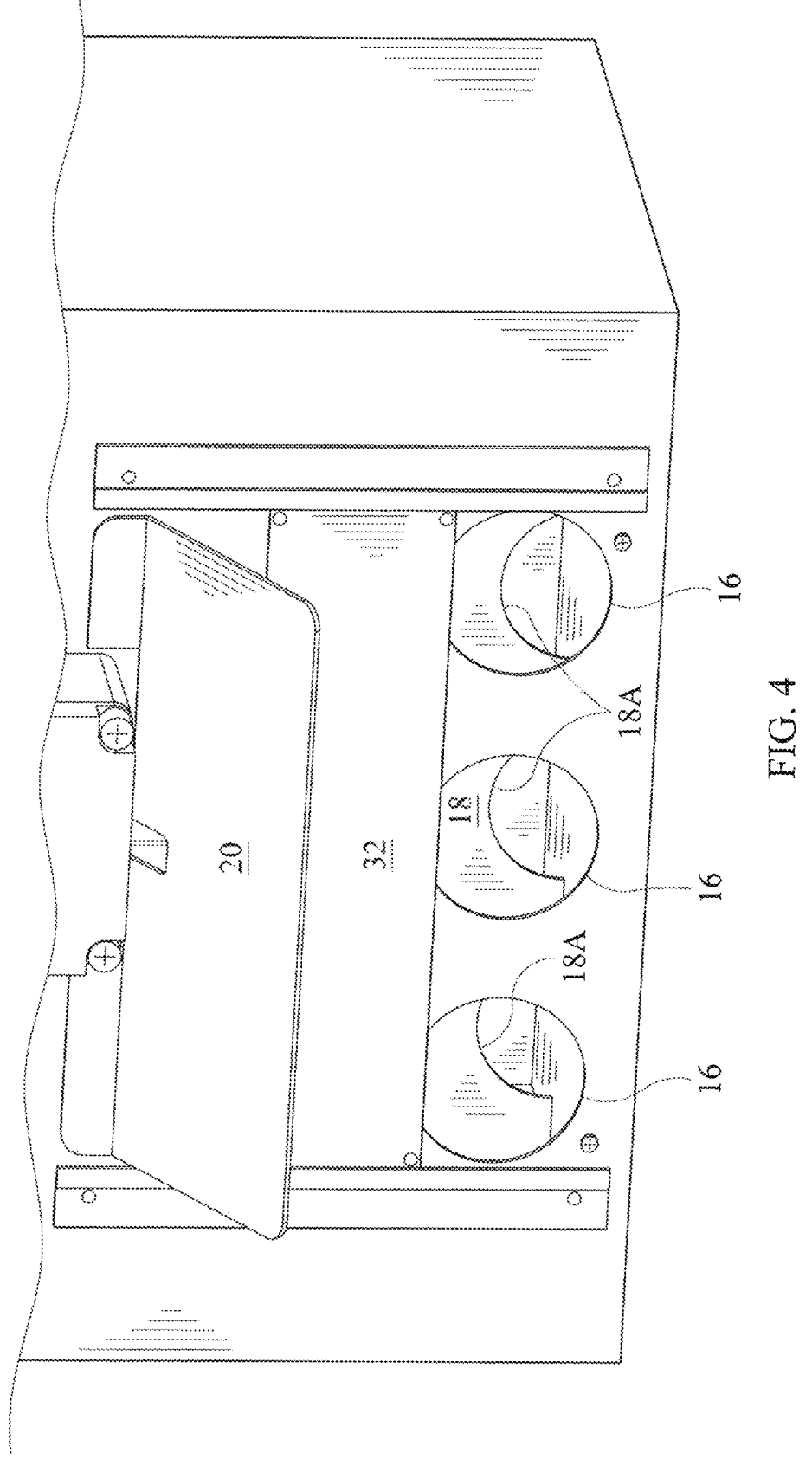
FIG. 4 is a close-up view showing the feeding access ports with the access door in the open configuration.

Notches 18A preferably align with feed access ports 16. A second interior baffle 22 projects angularly downward from a rear portion of the hopper interior. Second interior baffle 22 directs feed that is fed into hopper 12 generally forward to prevent feed from accumulating at the rear of the hopper. As illustrated in FIG. 3, a rain shield 20 is affixed to an exterior surface of the front wall of feed hopper 12, and disposed above feed access ports 16 to deflect rain, snow, or other debris away from feed access ports 16.

A significant aspect of the present invention involves providing controlled access to feed access ports 16 using s motorized door system, generally referenced as 30. Motorized door system 30 includes a feed access door 32 configurable between open and closed configurations. In the embodiment illustrated in FIGS. 1-8, feed access door 32 is configured as a vertically slidable door that raises above access ports 16 in the open configuration and lowers to a position in covering relation with access ports 16 when in the closed configuration. In an alternate embodiment, however, access door 32 may be pivotally configurable, or provided in any suitable open and closed configuration.

A further significant aspect of the present invention involves control of access door 32. More particularly, an automated chicken feeder in accordance with the present invention includes a weatherproof control housing 34 having a main control housing body 34A and a removable control housing cover 34B. Control housing 34 contains a control module, generally referenced as 36, which includes a dusk-to-dawn photocell 38 ("photocell"), an electric motor 39, and a battery power source 40 which cooperate to open access door 32 during daylight hours and close access door 32 at night. Photocell 38 comprises a light-sensitive sensor, such as a photocell, a photodiode, or other equivalent light-triggered apparatus, that is strategically placed to monitor the ambient light levels. Photocell 38 is electrically connected to control module 36 which processes the sensor's output and commands opening and closing of the motorized door accordingly. Control module 36 comprises an electronic circuit that receives input from photocell 38 and controls the operation of the access door 32. Control module 36 may include a microcontroller, logic circuitry, or other suitable electronic components to process the sensor data and generate appropriate signals to open or close the access door 32. Motor 39 includes an output shaft 39A connected to a first end of a string 41, with the opposing second end of string 41 connected to feed access door 32. As should be apparent, battery power source 40 provides electrical power to control module 36 to operate the motorized access door. Feed access door 32 is opened during daylight hours by actuation of motor 39 (triggered by photocell 38) whereby string 41 is wound about motor shaft 39A whereby tension on string 41 causes door 32 to rise above feed ports 16. Conversely feed access door 32 closes under the influence of gravity by reverse actuation of motor 39 (triggered by photocell 38) whereby string 41 is unwound from motor shaft 39A such that door 32 lowers to the closed position under the influence of gravity. In an alternate embodiment, electrical power may be obtained from an A/C power source, or by alternative energy sources such as solar panels.

Feed access door 32 preferably slides within a pair of opposing slots defined by a pair of tracks 33 connected to the front of feed hopper 12 on opposing sides of feed ports 16, such that the feed ports disposed therebetween. It is important that tracks 33 do not include obstructions, particularly at the bottom ends thereof, referenced as 33A, so that any feed or feed particles are allowed to fall from the bottom of the tracks to prevent binding of the feed access door. A plurality of boss members, referenced as 32A, project from feed access door 32 in proximity to tracks 33 to maintain feed access door in alignment with tracks 33 to prevent the door from binding. A pair of stop bosses 35 preferably project from the front housing wall below the feed access ports 16 to provide stop structures for door 32.

Figure 7:
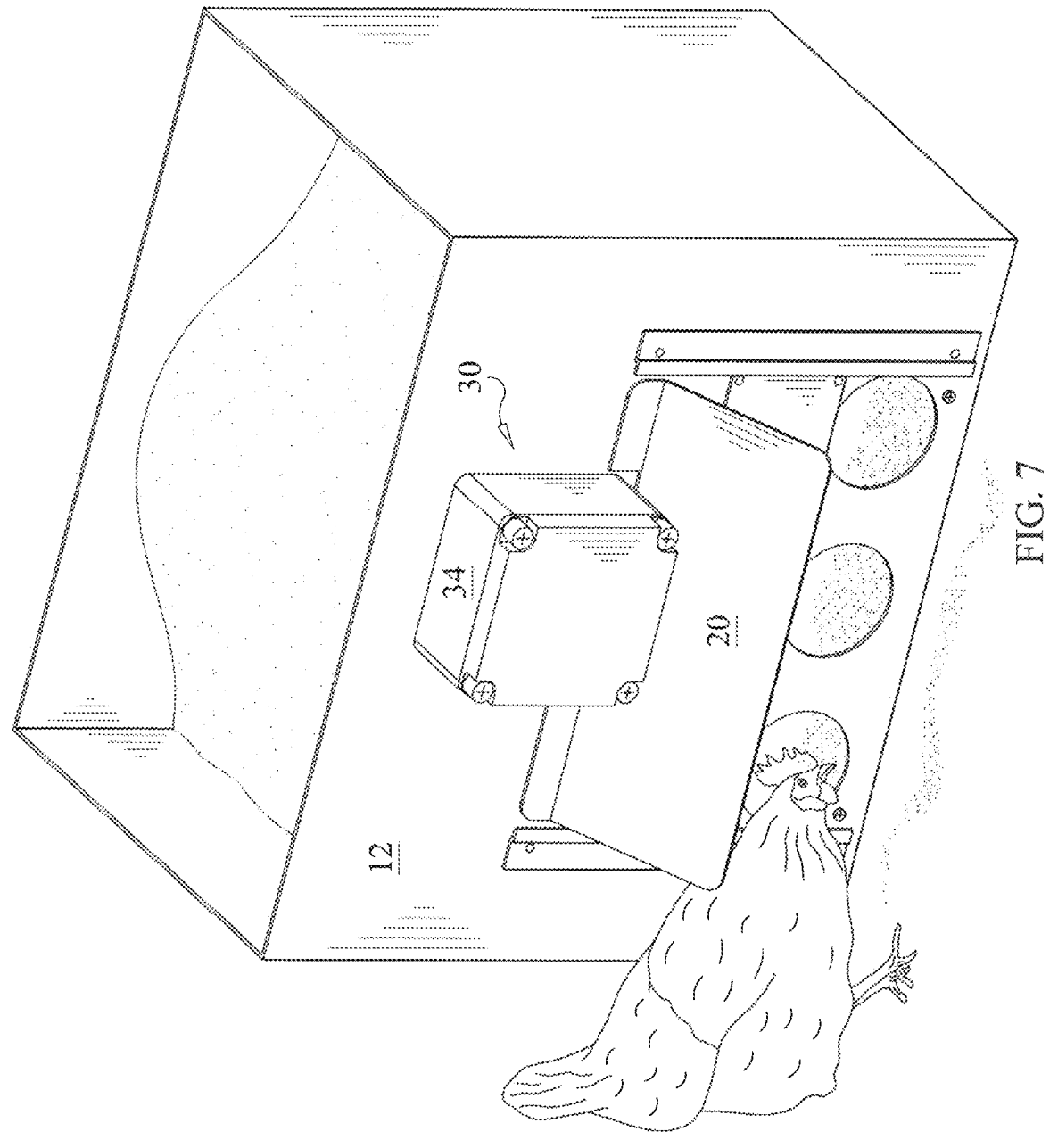
FIG. 7 is an open top front perspective view showing chickens accessing feed through the feed access ports of the automated chicken feeder of the present invention.
Figure 8:
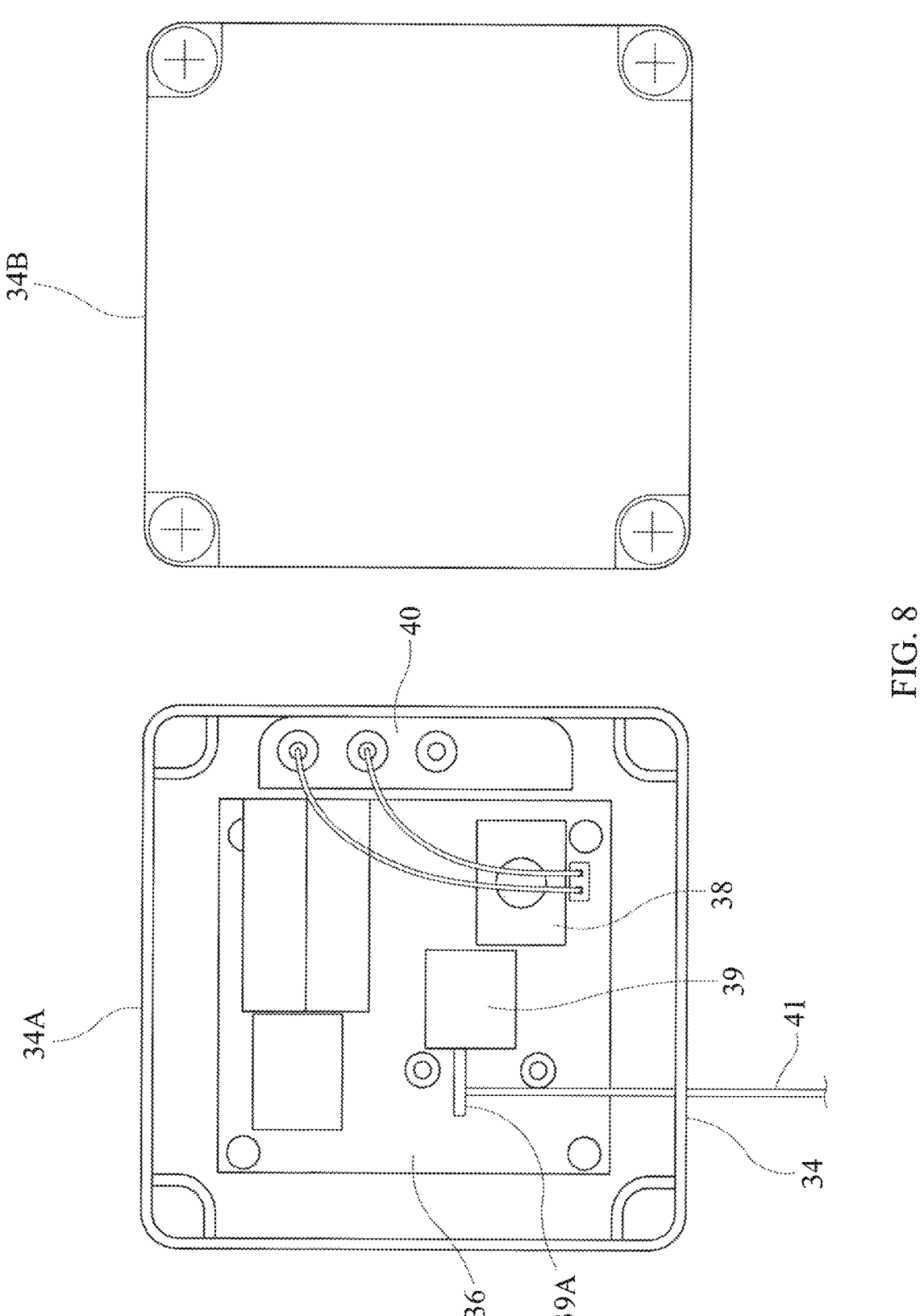
FIG. 8 is a view on the enclosure containing the control circuit, power source, and photocell, along with the enclosure cover.

An automated chicken feeder 10 in accordance with the present invention generally operates as follows. During daylight hours, photocell 38 detects the presence of a predetermined level of ambient light and sends a signal to control module 36. In response to the photocell sensor's input, the control module activates a motor 39, causing access door 32 to open, allowing chickens access to the feed via exposed feed ports 16 as seen in FIG. 7. As darkness falls, the ambient light levels decrease, and photocell 38 detects the reduction of ambient light below the predetermined level and sends, or terminates the sending of, a signal to control module 36 which allows door 32 to close under the influence of gravity to the position seen in FIG. 2 thereby preventing rodents and the like from accessing the feed during the night. Photocell 38 preferably includes a sensitivity adjustment feature that allows for manual adjustment of photocell sensitivity thereby allowing for user selection and adjustment of the ambient light levels required to open and close feed access door 32.

An automated chicken feeder in accordance with the present invention realizes a number of advantages. Rodent Prevention: By automatically closing at night, the feeder effectively deters rodents from stealing the chicken feed, reducing waste and financial losses. Convenience: The automated system eliminates the need for manual intervention, providing convenience to poultry farmers and ensuring the chickens have access to feed during the day. Feed Protection: The feed hopper shields the feed from external elements, keeping it dry and maintaining its quality. Customizability: The control module can be programmed to adjust the timing of the door's operation, accommodating different daylight conditions and farming preferences.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An automated chicken feeder for containing and dispensing chicken feed, said automated chicken feeder comprising:
   a feed hopper having an open top, and a bottom;
   a feed hopper top configurable between an open configuration wherein feed may be loaded into said feed hopper, and a closed configuration;
   said feed hopper defining a plurality of feed access ports disposed in proximity to the bottom of said feed hopper;
   a feed access door disposed on the exterior of said feed hopper and vertically slidable within a pair of opposing tracks between a closed configuration in covering relation with each of said plurality of feed access ports, and an open configuration wherein each of said plurality of feed access ports is exposed;
   said feed access door including at least one boss member projecting therefrom in proximity to at least one of said pair of tracks to prevent the feed access door from binding;

a weatherproof control housing connected to said feed hopper and disposed above said plurality of feed access ports;
   a control module disposed within said weatherproof control housing, said control module including a photocell, a battery power source, an electric motor, and control circuitry all in electrical communication and adapted to control said electric motor in response to signals received from said photocell;
   said electric motor mechanically connected to said access door;
   said control module responsive to signals received from said photocell to activate said electric motor to open said feed access door when said photocell detects a predetermined level of ambient light, and to close said feed access port door, under the influence of gravity, when said photocell does not detect said predetermined level of ambient light.

2. The automated chicken feeder of claim 1, further including an exterior rain shield affixed to said feed hopper and disposed above said plurality of feed access ports.

3. The automated chicken feeder of claim 1, further including a first interior baffle projecting angularly downward into the hopper interior from a position above said plurality of feed access ports.

4. The automated chicken feeder of claim 3, wherein said first interior baffle includes a lower peripheral edge defining a notch.

5. The automated chicken feeder of claim 3, further including a second interior baffle projecting angularly downward from a rear portion of the hopper interior to direct feed toward said plurality of feed access ports.

6. An automated chicken feeder for dispensing feed, said automated chicken feeder comprising:
   a feed hopper defining an internal volume;
   said feed hopper and including an openable top providing access to said internal volume to allow feed to be placed therein, and a bottom;
   said feed hopper defining at least one feed access port disposed in proximity to the bottom thereof;
   a first interior baffle disposed within said internal volume and projecting angularly downward from a position above said at least one feed access port and terminating in spaced relation with the bottom of said feed hopper, said first interior baffle has a lower peripheral edge defining at least one notch in alignment with said at least one feed access port;
   a second interior baffle disposed within said internal volume and projecting downward from a rear portion of said hopper to direct feed toward said at least one feed access port;
   a feed access door disposed on the exterior of said feed hopper, said feed access door being vertically slidable between a closed configuration in covering relation with said at least one feed access port, and an open configuration;
   said feed access door slidable within a pair of opposing slots defined by a pair of tracks connected to the front of said feed hopper;
   said feed access door including at least one boss member projecting therefrom in proximity to at least one of said pair of tracks to prevent the feed access door from binding due to misalignment;
   a weatherproof control housing connected to said feed hopper;

a control module disposed within said weatherproof control housing, said control module including a photocell, a battery power source, and an electric motor;

said electric motor mechanically connected to said feed access door; and said control module responsive to signals received from said photocell to activate said electric motor, whereby said feed access door automatically positions said access door to said open configuration when said photocell detects a predetermined level of ambient light, and closes said access door when said photocell detects ambient light level below said predetermined level.

7. The automated chicken feeder according to claim 6 wherein each of said pair of tracks are free of obstructions at the bottom ends thereof.

8. The automated chicken feeder according to claim 6 wherein said access door includes a plurality of boss members projecting therefrom in proximity to said tracks to maintain said feed access door aligned with said tracks to prevent the door from binding.

\* \* \* \* \*